US006814783B2

United States Patent
Fitch et al.

(10) Patent No.: US 6,814,783 B2
(45) Date of Patent: Nov. 9, 2004

(54) FILTRATION MEDIA OF POROUS INORGANIC PARTICLES

(75) Inventors: Tom Fitch, St. Paul, MN (US); Majid Entezarian, Hudson, WI (US); James R. Johnson, Naples, FL (US)

(73) Assignee: Phillips Plastics Corporation, Phillips, WI (US)

( * ) Notice: Subject to any disclaimer, the term of this patent is extended or adjusted under 35 U.S.C. 154(b) by 43 days.

(21) Appl. No.: 10/363,849
(22) PCT Filed: Feb. 28, 2002
(86) PCT No.: PCT/US02/05753
§ 371 (c)(1),
(2), (4) Date: Mar. 14, 2003
(87) PCT Pub. No.: WO02/070105
PCT Pub. Date: Sep. 12, 2002

(65) Prior Publication Data
US 2004/0011203 A1 Jan. 22, 2004

Related U.S. Application Data

(63) Continuation of application No. 10/076,144, filed on Feb. 15, 2002.
(60) Provisional application No. 60/272,044, filed on Mar. 1, 2001.
(51) Int. Cl.[7] ........................... B01D 53/04; B01D 46/30
(52) U.S. Cl. ............................. 95/143; 95/148; 95/274; 95/276; 96/143; 96/146; 96/147; 96/228; 96/231; 96/233; 55/282.2; 55/385.1; 55/512; 55/516; 55/523; 55/524; 55/DIG. 30; 55/DIG. 36
(58) Field of Search ................. 95/90, 117, 121, 95/126, 141, 143, 148, 274, 276; 96/108, 121, 126, 130, 133, 143, 146, 147, 151, 228, 231, 233; 55/282.2, 282.3, 385.1, 385.3, 484, 512, 514, 515, 516, 523, 524, 525, DIG. 10, DIG. 17, DIG. 30, DIG. 36

(56) References Cited

U.S. PATENT DOCUMENTS

| 1,872,892 | A | 8/1932 | Clanton |
| 3,354,623 | A | 11/1967 | Keller |
| 3,837,269 | A | 9/1974 | Sweet et al. |
| 3,955,949 | A | 5/1976 | Rohrer |
| 3,970,558 | A | 7/1976 | Lee |

(List continued on next page.)

FOREIGN PATENT DOCUMENTS

| DE | 74 699 | 7/1970 |
| EP | 0 722 072 B1 | 7/1996 |
| EP | 1 238 679 | 9/2002 |
| GB | 1014594 | 12/1965 |
| GB | 1255268 | 12/1971 |

OTHER PUBLICATIONS

J. Clark, "Commercial Kitchen Ventilation Design: What You need to Know," Engineered Systems, Jan. 29, 2003, 5 pages.
"*Filter som sätter miijön I första rummef*", alrMet Metal Filter, Luftfilter, obtained from website @ www.luftfilter.com, Feb., 2001, (8 pages).

(List continued on next page.)

*Primary Examiner*—Duane Smith
*Assistant Examiner*—Jason M. Greene
(74) *Attorney, Agent, or Firm*—Foley & Lardner LLP

(57) ABSTRACT

Inorganic, porous particles filter a substance or substances from a flow of fluid such as a gas. The particles can be arranged into a bed to filter a substance (filtrate substance) from a fluid. The filtrate substance can collect on or within the pores of the inorganic particles. Collection of the filtrate substance within the pores of the particles rather than within the interstices of the bed enhances the filtering capacity and does not impede the flow of fluid through the bed of particles. Furthermore, the inorganic particles are re-usable, in that they can be subjected to harsh filtrate-separation techniques, e.g., heat treatment, solvent extraction, detergent washing, and centrifugal separation, yet retain their desired properties.

33 Claims, 2 Drawing Sheets

U.S. PATENT DOCUMENTS

| | | | |
|---|---|---|---|
| 4,022,118 A | | 5/1977 | Vandas |
| 4,082,661 A | | 4/1978 | Aoki et al. |
| 4,104,163 A | | 8/1978 | Grutsch |
| 4,118,206 A | | 10/1978 | Hagendoorn |
| 4,126,433 A | * | 11/1978 | Forssberg et al. ............. 55/524 |
| 4,172,031 A | | 10/1979 | Hall et al. |
| 4,177,142 A | | 12/1979 | Halbfoster |
| 4,231,768 A | | 11/1980 | Seibert et al. |
| 4,238,334 A | | 12/1980 | Halbfoster |
| 4,328,105 A | | 5/1982 | Arbuckle |
| 4,350,504 A | * | 9/1982 | Diachuk ...................... 96/126 |
| 4,388,086 A | * | 6/1983 | Bauer et al. .................. 95/143 |
| 4,484,563 A | | 11/1984 | Fritz et al. |
| 4,485,622 A | | 12/1984 | Takagi et al. |
| 4,595,509 A | | 6/1986 | Fox et al. |
| 4,604,110 A | | 8/1986 | Frazier |
| 4,610,705 A | | 9/1986 | Sarnosky et al. |
| 4,645,605 A | | 2/1987 | Durham |
| 4,682,992 A | * | 7/1987 | Fuchs .......................... 55/524 |
| 4,708,000 A | | 11/1987 | Besik |
| 4,721,624 A | | 1/1988 | Schumann |
| 4,805,525 A | | 2/1989 | Bivens |
| 4,811,724 A | | 3/1989 | Aalto et al. |
| 4,816,499 A | | 3/1989 | Nomura et al. |
| 4,872,892 A | | 10/1989 | Vartiainen et al. |
| 4,900,341 A | | 2/1990 | Csabai |
| 4,908,050 A | | 3/1990 | Nagashima et al. |
| 4,944,782 A | | 7/1990 | Rajendran et al. |
| 4,973,341 A | | 11/1990 | Richerson |
| 4,976,760 A | | 12/1990 | Helferich et al. |
| 5,003,693 A | | 4/1991 | Atkinson et al. |
| 5,087,272 A | | 2/1992 | Nixdorf |
| 5,124,177 A | | 6/1992 | Kasmark, Jr. et al. |
| 5,133,786 A | | 7/1992 | Anderson |
| 5,145,648 A | * | 9/1992 | Miyahara et al. ............. 96/146 |
| 5,154,743 A | | 10/1992 | Takato et al. |
| 5,171,720 A | | 12/1992 | Kawakami |
| 5,209,887 A | | 5/1993 | Von Blücher et al. |
| RE34,636 E | | 6/1994 | Bivens |
| 5,342,422 A | | 8/1994 | Wimbock |
| 5,384,290 A | | 1/1995 | Brezny |
| 5,404,799 A | | 4/1995 | Bivens |
| 5,442,924 A | | 8/1995 | Tsai et al. |
| 5,472,342 A | | 12/1995 | Welsh, II et al. |
| 5,486,370 A | | 1/1996 | Bivens |
| 5,497,620 A | | 3/1996 | Stobbe |
| 5,512,088 A | | 4/1996 | McKenzie |
| D373,625 S | | 9/1996 | Pereira |
| 5,567,090 A | | 10/1996 | Basak et al. |
| 5,567,392 A | | 10/1996 | Becker et al. |
| 5,624,875 A | | 4/1997 | Nakanishi et al. |
| 5,628,916 A | | 5/1997 | Stevens et al. |
| 5,632,889 A | | 5/1997 | Tharp |
| 5,693,298 A | | 12/1997 | Bar-Ilan |
| 5,700,973 A | | 12/1997 | Siddiqui |
| 5,733,350 A | | 3/1998 | Muller et al. |
| 5,750,026 A | | 5/1998 | Gadkaree et al. |
| 5,766,458 A | | 6/1998 | Sekhar et al. |
| 5,776,354 A | * | 7/1998 | van der Meer et al. ........ 95/274 |
| 5,792,360 A | * | 8/1998 | Algar .......................... 210/697 |
| 5,810,895 A | | 9/1998 | Stachle et al. |
| 5,976,221 A | * | 11/1999 | Bowman et al. ............. 95/143 |
| 5,997,618 A | | 12/1999 | Schneider et al. |
| 6,010,558 A | * | 1/2000 | Ackland ...................... 95/141 |
| 6,041,772 A | | 3/2000 | Ward et al. |
| 6,042,628 A | | 3/2000 | Nishikiori et al. |
| 6,051,199 A | | 4/2000 | Teller |
| 6,074,177 A | * | 6/2000 | Kobayashi et al. .... 55/DIG. 17 |
| 6,077,335 A | | 6/2000 | Schneider et al. |
| 6,077,800 A | | 6/2000 | Takahashi et al. |
| 6,079,407 A | | 6/2000 | Lai |
| 6,095,037 A | | 8/2000 | Savage et al. |
| 6,165,519 A | | 12/2000 | Lehrer et al. |
| 6,168,651 B1 | | 1/2001 | Tuma et al. |
| 6,237,587 B1 | | 5/2001 | Sparling et al. |
| 6,251,153 B1 | | 6/2001 | Neitzel et al. |
| 6,290,742 B1 | | 9/2001 | Pakkala et al. |
| 6,293,983 B1 | | 9/2001 | More |
| 6,340,379 B1 | | 1/2002 | Penth et al. |
| 6,432,177 B1 | | 8/2002 | Dallas et al. |
| 6,454,825 B1 | | 9/2002 | Cheimets et al. |
| 6,464,770 B1 | | 10/2002 | Palm et al. |
| 6,468,323 B1 | | 10/2002 | Chwala |
| 6,605,648 B1 | | 8/2003 | Johnson et al. |
| 6,641,788 B1 | * | 11/2003 | Ogawa et al. ................. 95/143 |
| 2003/0024393 A1 | * | 2/2003 | Lim ............................ 95/274 |
| 2003/0101986 A1 | | 6/2003 | Maier |
| 2003/0164093 A1 | | 9/2003 | Brownell et al. |

OTHER PUBLICATIONS

"Filter which puts the environment first", airMet Metal Filter, Luftfilter, obtained from website @ www.luftfilter.com, Oct., 2001, (8 pages).

Grease–X–Tractor™ Centrifugal Filtration, Grease Grabber™–80 Two–Stage Filtration System, Greenheck, Aug. 2003, 18 pages.

Greenheck, Various Promotional Materials, 10 pgs., (date unknown).

"Greenheck Takes the Grease Out of Kitchen Ventilation," Dec. 2001, 4 pages.

"List Prices Effective Jan. 1, 2000, How to Order Flame Gard Grease Filters", Flame Gard, obtained from website @ www.flamegard.com, (4 pages).

Livchak et a., "The Facts Mechanical Grease", American Society of Heating, Refrigerating and Air–Conditioning Engineers, Inc., Copyright 2003, Kitchen Ventilation / A Supplement to ASHRAE Journal Jun. 2003, (p. K14–K17, 4 pages).

M. Sherer, "Clearing the Air," pp. 228–231, Foodservice Equipment Report, Jun. 2003.

"Takmodul med dlytande tätning", Luftfilter, obtained from website www.luftfilter.com, Jun., 2001, (4 pages).

United Air Specialists, Inc., Promotional Materials for "Smog–Hog,", 4 pgs., 2001.

"We prioritise expertise", Luftfilter, obtained from website @ www.luftfilter.com, Feb., 1999, (4 pgs.).

Engineering and Design Adsorption Design Guide, Department of the Army, U.S. Army Corps of Engineers, Mar. 1, 2001, 99 pages, Design Guide No. 1110–1–2.

U.S. patent application Ser. No. 09/286,919, Johnson et al., filed Apr. 6, 1999.

G. Elliott et al., "The Increasing Use of Ceramic Filters in Air Pollution Control Applications," Filtr. Sep. vol. 34, No. 4, pp. 331–335, 1997, Elsevier Science Ltd.

N. Singh et al., "Processing Design and Economic Analysis of A Ceramic Membrane System for Microfiltration of Corn Starch Hydrolysate," Journal of Food Engineering, vol. 38, No. 1, pp. 57–67, 1998, Elsevier Science Ltd.

J. Clark, "Commercial Kitchen Ventilation/IMC–2000," pp. 1–7 (date unknown).

M. VandenBoom, Greenheck Product Presentation, 26 pgs., Oct. 23, 2002.

Greenheck Promotional Materials for "Grease Grabber–80," 18 pgs., 2002.

* cited by examiner

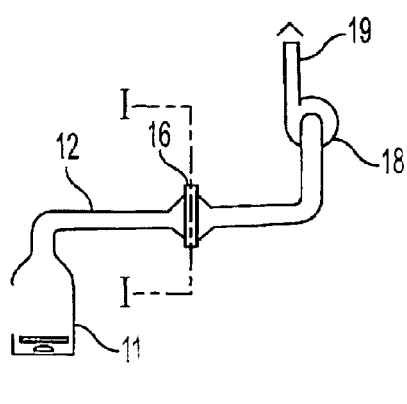
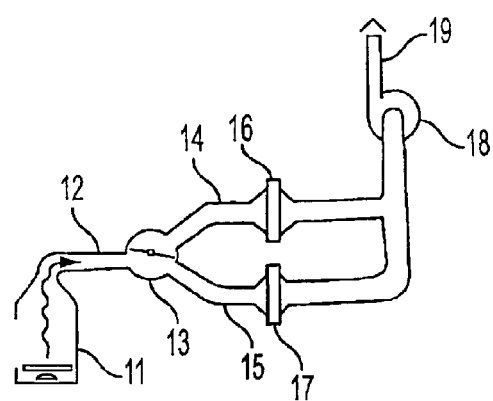
FIG. 2A  FIG. 2B
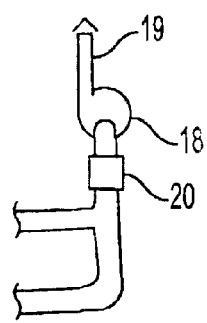
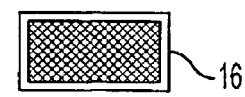
FIG. 2C  FIG. 2D

FILTRATION MEDIA OF POROUS INORGANIC PARTICLES

CROSS-REFERENCE TO RELATED PATENT APPLICATIONS

This application is the National Stage under 35 U.S.C. §371 of International Patent Application No. PCT/US02/05753 filed on Feb. 28, 2002 which claims priority to U.S. Provisional Patent Application No. 60/272,044, filed on Mar. 1, 2001 and U.S. patent application Ser. No. 10/076,144, filed on Feb. 15, 2002, each of which is hereby incorporated by reference.

FIELD OF THE INVENTION

The invention relates generally to filtration. More specifically, the invention relates to the use of porous inorganic particles in a filtration apparatus, such as a packed bed, where the apparatus includes porous, inorganic particles. The invention also contemplates the use of the porous, inorganic particles, particularly in a packed bed, which are capable of filtering one or more substances from a fluid, such as air.

BACKGROUND OF THE INVENTION

Filtration media can be used to prevent undesirable vapors, particulate, or suspended droplets in a gas stream from escaping into the atmosphere. For example, whenever an oleo material or substances (e.g. grease, oil or fat) are heated, some will vaporize or form droplets. There is a desire to prevent such vaporized or droplet material from escaping into the air, unfiltered. Presently employed filtering media can include an aggregate of fibrous material, such as organic fiber mat or inorganic fiberglass, that extend over the traveling path of a vapor or liquid, such that the fibrous material catches the oleo vapors or droplets as they pass through the interstices of the filtering material. Although, initially, such filtering mechanisms may be capable of efficiently removing the oleo vapors or droplets from the air stream, the oleo vapors or droplets gather in the interstices of the filtering material in increasing quantities as the filtration process progresses, resisting the flow.

The flow rate of air through the filter immediately begins to decrease as the oleo material begins to collect on the filter media. This build-up of undesirable substances can substantially or completely block the flow of air and its load of material to be filtered through the filter, requiring frequent replacement of the filter. This replacement process typically requires a shut down of the mechanism that produces the vapor. Often times, the filter, upon having the undesirable substance collected thereon is disposed of without further use.

U.S. Pat. No. 5,776,354, issued to van der Meer et al., discloses a method for separating a dispersed liquid phase (i.e. an oil film) from a gas, using a filter bed of a particulate, porous polymer material whose size is on the order of 0.1 to 10 mm. Although van der Meer et al. teach that the dispersed liquid phase can fill into the pores of the particulate material, the particulate material is a polymer, thereby restricting the available methods for subsequently separating the liquid phase from the particulate material. In fact, van der Meer et al. only teach centrifugal force (i.e. a centrifuge) for separating the oil from particulate material. Thus, there remains need for filtration media that not only (1) ameliorate the problem of restricted airflow through the filter, but (2) also can undergo harsher filtrate-separation processes, yet subsequently retain its desired properties for repeated use.

SUMMARY OF THE INVENTION

Accordingly, it is an object of the invention to provide renewable, porous filtering media to separate a filtrate substance (in the form of vapor, aerosol, and/or liquid) from a fluid such as a gas or liquid, such that the flow of the fluid through the porous filtering media will not be substantially impeded prior to the time said porous media are filled with said vapor, aerosol, and/or liquid.

It is a further object of the invention to provide filtering media that can retain their filtering properties subsequent to undergoing a harsh filtrate-separation protocol.

It is another object of the invention to provide filtering media that permit a continuous, uninterrupted fluid flow. This provides a uniform filtration mode until the media are saturated.

The invention provides for a filtration media that includes porous particles (whose composition is inorganic) arranged to separate one or more filtrate substances from a fluid or fluids wherein the porous particles collect and retain within themselves the filtrate substance(s). In a preferred embodiment, the porous particles are arranged in a packed bed. In a particularly preferred embodiment, the particles relinquish substantially all of the substances during a separation step and the particles maintain the ability to collect the substance(s) repeatedly.

The invention further contemplates an apparatus for separating one or more substances from a moving fluid which includes a housing for said packed bed of porous particles located in a duct through which said moving fluid with the filtrate substance(s) is passing. Various designs may be used so as to cycle the moving fluid through a plurality of such housings and beds without having to shut down the system. Further, the beds may be treated in said cycles so as to refresh the particles for their intended use.

In a preferred embodiment, the invention describes a method for substantially separating one or more oleo substance(s) from a fluid, particularly a gas such as air, which comprises the steps of placing the inorganic, porous particles, which may be spherical or pellet-like in shape or have other shapes, into contact with the fluid, which moves relative to the particles; and allowing the oleo substance(s) to collect within at least a portion of the inorganic particles as the vapor composition passes at least substantially through the inorganic porous particles. In one sense, the inorganic porous particles are arranged to form a network, such as a packed bed, suitable for filtering the oleo substances from the moving fluid.

Methods according to the invention further comprise substantially separating the filtrate substance from the inorganic, porous particles and repeating the steps of placing the inorganic, porous particles into contact with the fluid and allowing the filtrate substance to collect within at least a portion of the inorganic particles.

In another embodiment, the filtrate substance includes hydrophilic vapors or suspended droplets. This invention provides a method for substantially separating the hydrophilic vapors or suspended droplets by placing the inorganic, porous particles, preferably in the form of a packed bed, into contact with a fluid flow which contains the filtrate substance. This allows the hydrophilic substance to collect within at least a portion of the inorganic particles due to the hydrophilic nature of internal and external surfaces of the porous particles. Further, the internal surfaces of the pores of said particles may be treated with reactive substances that may be biocidal, catalytic, or chemically reactive with the contents of said vapors or suspended droplets.

These and other objects will be apparent to a skilled worker, as shown by the embodiments described and contemplated herein.

BRIEF DESCRIPTION OF THE DRAWINGS

FIGS. 2A–2D show a filtration apparatus comprising a packed bed of inorganic particles and a ventilation system according to another embodiment of the present invention.

DESCRIPTION OF THE PREFERRED EMBODIMENTS

Figure 1:
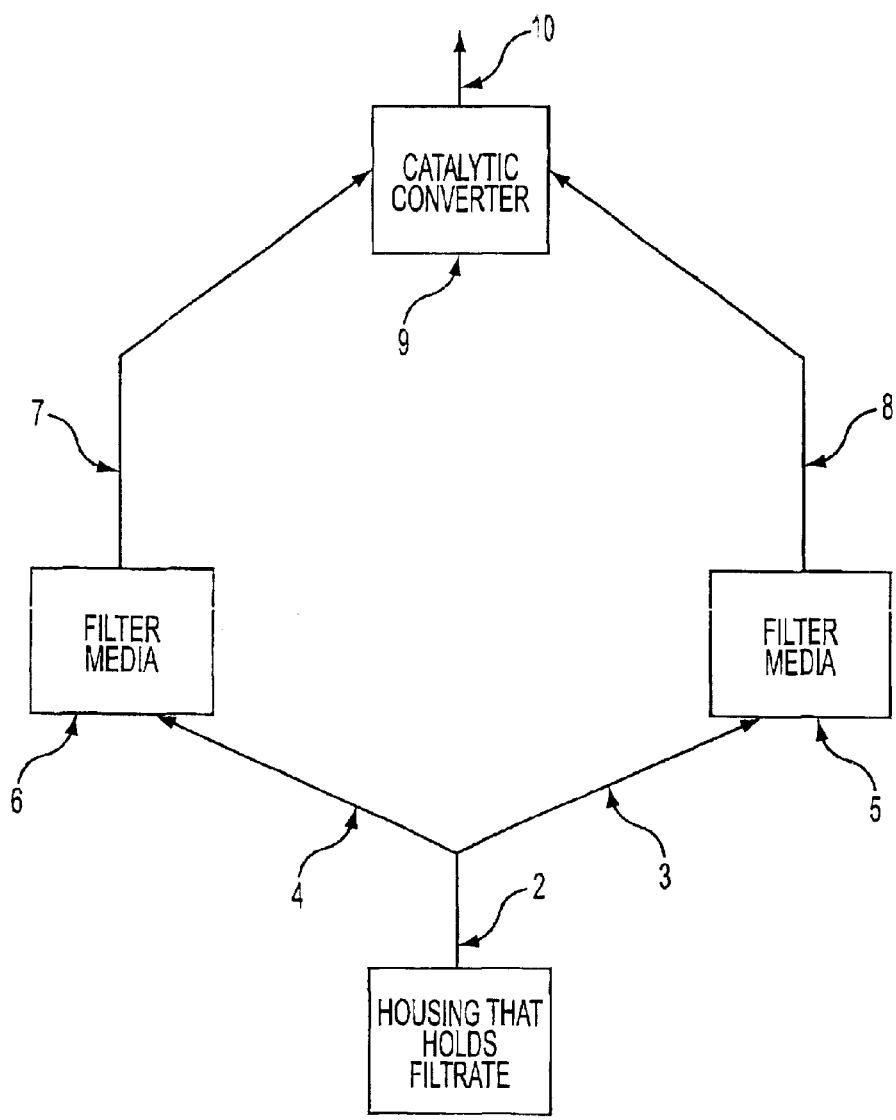
FIG. 1 shows a filtration apparatus comprising a packed bed of inorganic particles and a ventilation system according to one embodiment of the present invention.

The present invention provides, inter alia, inorganic, porous particles that are capable of trapping filtrate substances from a fluid. As used herein, "filtrate substance" is defined as the substance (e.g., gas, vapor, liquid, suspended droplets, etc.) that is intended to be removed from the fluid. The fluid containing the filtrate substance can be either a gas or liquid.

The particles are suitable for separating one or more of the filtrate substances from a fluid flow, e.g. a gas, which contains such filtrate substances. To this end, in a preferred embodiment, the inorganic particles can be arranged into a packed bed-like formation, or network, such that the network comprises (1) particles interacting with each other and (2) interstices defined between the exterior surface area of the interacting particles. Thus, in one embodiment, a fluid containing the filtrate substances can flow through (or substantially through) the packed bed, leaving behind one or more filtrate substances that collect within at least a portion of the particles. Although the embodiments described herein indicate that the fluid moves relative to the filter media, other embodiments such as those in which the filter media move are also contemplated.

A particularly preferred combination is one in which the filtrate substance is a grease, fat or oil (collectively referred to as an "oleo substance") and the fluid is air.

As indicated, the inorganic particles, or media, that comprise the core of the filtration apparatus described more fully below, are porous, having an external surface area and a network of open channels that define internal surfaces. In a preferred embodiment, the inorganic particles can have any suitable shape, e.g., spherical, pellet-like, etc. The particles may have any suitable size depending on end use, and may range in size from about 0.25–4 mm, preferably 0.33–3.5 mm, and more preferably 0.5–3 mm. For non-spherical particles, the size measurement is taken at the largest dimension. In other suitable embodiments, the particles can have a size that ranges from greater than 4 mm, preferably from greater than 4 to 50 or even 100 mm. In some embodiments, the pores preferably have a mean size between about 0.01 to 100 microns, preferably 0.1 to 10 microns. The media can also have other shapes such as porous fibers and other formed shapes such as rings, saddles, etc.

The inorganic particles can have porosity in the range of 15–70%, preferably 30–70%. These internal surfaces accordingly are exposed to the filtrate substance (e.g. oleo) substance(s) passing through the network of particles. That is, the pores of the inorganic particle or particles are large enough such that the filtrate substance can fit inside of, or otherwise pass through, one or more pores. Accordingly, in one embodiment, the surfaces of the pores can comprise an oleophilic substance and, therefore, attract an oleo substance. In this sense, a relatively powerful force, such as surface tension, can draw the filtrate substance within the openings of the pores. Hence, the filtrate substance, such as an oleo substance, can collect within the pores in lieu of and/or in addition to adhering to the exterior surface area of the particles. In other embodiments, described more fully below, the interior and/or exterior of the particle can have a catalyst and/or reactant coated thereon.

The open channels, e.g., pores, of the inorganic particle in a preferred embodiment can exist in a reticulated, open, sintered structure. In this sense, a reticulated structure is a structure made up of a network of interconnected struts that form a strong, interconnected continuum of pores. A method for preparing a sinterable structure is disclosed in co-pending application Ser. No. 09/286,919, entitled "Sinterable Structures and Method", which is hereby incorporated herein by reference in its entirety. More specifically, this co-pending application describes processes for producing a porous, sintered structure, comprising (1) preparing a viscous mixture comprising a sinterable powder of ceramic or metal dispersed in a sol of a polymer in a primary solvent; (2) replacing the primary solvent with a secondary liquid in which the polymer is insoluble, thereby producing a gel which comprises an open polymeric network that has the sinterable powder arranged therein; (3) removing the secondary liquid from the gel; and (4) sintering the sinterable powder to form the open, porous structure.

The particles of the invention may be comprised of any inorganic material that confers the requisite characteristics upon the particles (e.g. capable of containing pores, at least substantially maintains porosity and ability to collect a filtrate substance inside the pores of the particles after a filtrate-separation operation described more fully below, preferably a harsh filtrate separation). An illustrative list of suitable materials of which the particles can be comprised include: a ceramic material such as transition metal oxides, zircon, zirconia, titania, silica, alumina, alumina-silica (clay) or a variable blend thereof. An especially preferred particle is a clay such as kaolin, bentonite or montmorillonite. Porous iron made by 09/286,919 also will absorb oleo substances.

The individual porous particles, once formed, can be assembled into a network suitable for filtering the one or more substances from the fluid composition. The porous particles can be arranged as a packed bed in a vertical plane, a horizontal plane or both. Preferably, each porous particle interacts with at least one other particle, yet forms interstices between the particles, such that a fluid can pass through the interstices. In one embodiment, the porous particles form a bed that defines a constant surface area. The particles preferably extend along at least the horizontal or vertical cross section of the bed or casing to define a continuous section of alternating particles and interstices. An example is a bed of porous particles packed within a perforated or porous wall container. Alternatively, two or more particles of the bed may be physically attached, such as by heating the particles to sufficient temperature to sinter the particles together, while maintaining space between the particles sufficient to allow the passage of a vapor or liquid therethrough.

Once formed, the inorganic porous particles, which can be in the form of the network described above, can be placed into contact with a fluid composition containing the filtrate substance, preferably an oleo substance. The particles may be positioned in association with a fluid such that the fluid passes through or at least substantially through the interstices and/or pores of inorganic particles, leaving behind at least a portion, but preferably the majority, of the filtrate substance suspended in the fluid. In this sense, the filtrate substance collects on and within the inorganic particles.

As the fluid passes through the packed bed of inorganic particles, there is resistance to the flow, resulting in a drop in pressure on the exit side of the bed. In a preferred embodiment, this drop in pressure remains substantially constant, which means that the filtrate substance collects within the pores to a greater extent than in the interstices between the exterior surface area of the particles. At any time, the inorganic particles can be removed from the flow of fluid, in order to separate the filtrate substance from inorganic particles. In some embodiments, the particles may be regenerated, in situ. However, it is preferred that the particles are removed from the fluid flow whenever the filtrate substance at least substantially has filled the pores and/or may have begun to fill the interstices between the inorganic particles. This conveniently can be determined by detecting a measurable decrease in the pressure of the fluid through the filter media.

The inorganic particles may be removed from the fluid flow in any number of ways, from simple replacement to automated systems. For instance, the particles can be a magnetic material and an external magnetic force may be applied to draw the particles away from the fluid flow, such as vapor flow. Alternatively, gravitational forces could be employed to move the particles downwardly, for example, beneath the fluid flow. In addition, a vacuum force could be used to pull the particles out of the stream of flowing fluid. Further still, the invention contemplates the employment of a see-saw apparatus that has the filter media on both ends of a pivoting elongated member, where the media can be raised and lowered from a filtering position to a regeneration position. In a similar manner, a rotating wheel or disk containing the filtering media can be rotated from a position of filtering to a position of separation and/or regeneration.

The separation step preferably is carried out such that, upon removing the filtrate substance from the inorganic materials, the inorganic particles again can be used to filter a substance from a moving stream of fluid as before. Filtrate-separation operations may be selected from the group consisting of heat treatment at a temperature sufficient to volatilize the filtrate substances and burn off any remaining residue (up to 1000° C.), solvent extraction, detergent wash, and centrifugal removal, and combinations of these separations. Particularly preferred separation operations are harsh filtrate separations such as heat treatment and solvent extraction. Suitable solvents for removing the filtrate substance may include organic solvents or preferably known biodegradable solvents. A detergent suitable for the detergent washing step can be a commercial one, e.g., Dawn. Other known suitable detergents can also be used. A significant advantage of the present invention is that the inorganic porous particles are capable of withstanding harsh separation treatments where necessary as described above. After the filtrate substance is removed from the inorganic particles, the filtrate substance may be discarded and the particles can be re-positioned within the stream of the flowing fluid. The filtrate collection and separation process can be repeated multiple times.

In the catalytic embodiment, described below, the separation step can be facilitated by incorporation of the catalyst. Because the internal pores are completely available in the sintered structure of 09/285,919, a catalyst coated on the pore walls substantially increases the catalyst availability to reactants, e.g. hydrocarbons and oxygen.

In another embodiment, for instance, porous particles of the invention could contain hydrophilic surfaces within the porous area. The invention, accordingly, contemplates the removal of malodorous or toxic vapors from air. Current filtration apparatus in air conditioning systems, for example, might not effectively remove harmful vapors or droplets, such as those carrying spores or bacteria, e.g. the so-called "Legionnaire's Disease." A porous filter, as described herein, having surfaces adapted to be hydrophilic, could capture noxious vapors or droplets. Thereafter, the trapped vapors or droplets could be heated, thereby destroying any bacteria, spores, virus or other harmful material associated with the vapors or droplets. In a preferred embodiment, the surfaces of the pores, such as struts, can be coated or impregnated with a biocidal agent, such as well known silver containing biocides, e.g., silver iodide and/or antibiotics, e.g., tetracycline. Another possible coating could include diazeniumdiolate in a siloxane polymer. Of course, the exterior surface of the porous particles can also be coated or impregnated with a biocidal agent.

In still another embodiment, the filtrate substance is treated and subsequently removed by reacting the filtrate substance using a catalyst that is within the pores and on the exterior surface of the particles. Optionally, the filtrate substance can be reacted with another component that may be coated on the particle, in the fluid, or even the fluid itself. In one embodiment, ethane can be reacted in and subsequently removed from a gas stream by converting the ethane to ethylene in the presence of hydrogen using a noble metal catalyst on the surface and within the pores of the particles. This catalytic reaction can occur by passing the fluid over or through a bed of the inorganic particles, or within a fluidized bed of the same particles.

The invention also provides an apparatus for substantially separating one or more filtrate substances from a moving fluid stream. This apparatus may comprise a packed bed or network of inorganic particles, as described, in combination with a series of vents or ducts that channel the fluid stream towards the network of inorganic particles. The system also may comprise a series of vents or ducts that channel the fluid to another location, upon passing through the network of inorganic particles. For instance, the fluid may exit into the atmosphere upon passing through the inorganic particles. Alternatively, the fluid first may pass through a catalyst bed for further treatment of the fluid.

The system can be constructed such that the source creating the fluid flow does not need to be turned off in order to perform the filtrate substance removing step. To this end, the system may comprise multiple series of ducts or vents that can be operated in tandem with each other. Accordingly, one series of ducts or vents may be opened, while the others are closed. The open series would act to direct the fluid, such as a vapor, to the inorganic particles and then away from the particles after passing therethrough. At the appropriate time, the inorganic particles, having the filtrate substance collected therein, can be cleaned by a filtrate-separation protocol, for example. Further, the inorganic particles may remain substantially at their present location or they may be moved to a different location (e.g. by magnetic, vacuum or gravitational force) before separating the filtrate substance (s) from the particles. At this stage, the open series of vents or ducts can be closed and the closed series then can be opened, as the filtering process continues.

One non-limiting example of a filtration apparatus contemplated by the invention is described in the schematic diagram of FIG. 1. With reference to FIG. 1, housing (1) holds the filtrate substance, e.g., an oleo substance. Upon being heated within the housing, the filtrate substance in a fluid (in this instance in a stream of flowing exhaust air)

enters duct (2). The filtrate substance can then be selectively passed into duct (3) or (4), such as by a valve. The filtrate substance enters the filter media (5) or (6), that includes the network of inorganic particles. A pre-filter (not shown) may be positioned before the filter media.

The filtrate substance collects within interstices and pores of the particles (not shown), as the exhaust passes through the filter media. Thereafter, the exhaust passes into and through ducts (7) or (8) which lead to catalytic reactor (9). After passing through catalytic reactor (9), the exhaust can be vented into the atmosphere (10).

The filter media can be positioned adjacent to electric heater (not shown), that, when activated, can transfer heat to particles in the filter media. The heat will cause the filtrate substance, such as an oleo substance (not pictured) to separate from the particles that can be drained as needed. Generally, the heat-separation process occurs when the apparatus is shut down, or when the fluid flow directed into the other filter media.

Another embodiment is shown in connection with FIGS. 2A–2D. With reference to FIG. 2A, housing (11) holds the filtrate substance, e.g., an oleo substance. Upon being heated within the housing, the filtrate substance enters duct (12). The filtrate substance then enters into filter media (16). FIG. 2D shows the cross section of filter media 16 taken along line I—I. In an embodiment shown in FIG. 2B, the filtrate substance can then be selectively passed into duct (14) or (15), such as by a valve (13), and then enter the filter media (16) or (17), that includes the network of inorganic particles. A pre-filter (not shown) may be positioned before the filter media.

Thereafter, in the embodiment of FIGS. 2A and 2B, the exhaust gas passes into fan (18) and is vented into the atmosphere through vent (19). In the embodiment shown in FIG. 2C, the exhaust first passes into catalytic reactor (20) before passing into fan (18).

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

As used herein and in the following claims, articles such as "the," "a" and "an" can connote the singular or plural. All documents referred to herein are specifically incorporated herein by reference in their entireties.

What is claimed is:

1. A ventilation system for substantially separating oleo material from an air stream comprising:

a bed of inorganic, porous particles for absorbing the oleo material which is separated from the air stream;

wherein the ventilation system is configured to channel the air stream from an area where the oleo material is being heated to another location, the ventilation system being configured so that at least substantially all of the air stream flows through the bed.

2. The ventilation system of claim 1, wherein a dimension of a single inorganic, porous particle is about 0.1 mm to about 4 mm.

3. The ventilation system of claim 1, wherein the inorganic, porous particles are spherical, pellet or pellet-like in shape, ring shaped, saddle shaped or a combination thereof.

4. The ventilation system of claim 1 wherein the particles include an exterior surface and a plurality of channels that open onto the exterior surface and define internal surfaces for collecting the oleo material.

5. The ventilation system of claim 4, wherein the channels have a mean size of about 0.01 micron to about 10 micron.

6. The ventilation system of claim 1, wherein the porous, inorganic particles are about 15% porous to about 70% porous.

7. The ventilation system of claim 1, wherein the inorganic, porous particles are at least partially composed of transition metal oxide, zircon, silica, alumina, alumina-silica, kaolin, bentonite, montmorillonite, or a combination thereof.

8. The ventilation system of claim 4, wherein the rate of collection of the oleo material within the channels is greater than the rate that the oleo material collects within interstices between the particles.

9. The ventilation system of claim 4, wherein the oleo material is collected within the channels by capillary action.

10. A method for substantially separating an oleo material from an air stream comprising:

moving at least substantially all of the air stream through a bed of inorganic, porous particles configured to absorb the oleo material;

wherein the bed of particles is positioned in a ventilation system which is used to channel the air stream from an area where the oleo material is being heated to another location.

11. The method of claim 10, wherein the drop in pressure of the air stream passing through the bed remains substantially constant for a period of time during which the particles are being used to filter the oleo material from the air stream.

12. The method of claim 10, further comprising substantially separating the oleo material from the inorganic, porous particles.

13. The method of claim 12, wherein after the separation step, the inorganic, porous particles are again placed into contact with the air stream.

14. A filtration media comprising a three-dimensional bed of inorganic, porous particles arranged to separate oleo material from an air stream at least substantially all of which passes through the bed, wherein the bed of inorganic, porous particles defines interstices between at least some of the inorganic, porous particles, and wherein at least some of the inorganic, porous particles include an exterior surface and a plurality of pores that open onto said exterior surface and define internal surfaces for collecting the oleo material from the exterior surface to mitigate collection of oleo material within the interstices and wherein said particles and pores include an oleophilic surface that draws the oleo material within the pores from the exterior surface of the particles; and wherein the filtration media is configured to be positioned in a ventilation system which is used to channel the air stream from an area where the oleo material is being heated to another location.

15. The filtration media of claim 14, wherein a dimension of a single inorganic, porous particle is about 0.25 mm to about 4 mm, and the pores have a mean cross-sectional dimension of no less than about 0.01 micron.

16. The filtration media of claim 14, wherein a dimension of a single inorganic, porous particle is greater than about 4 mm.

17. The filtration media of claim 14, wherein the inorganic, porous particles are spherical, pellet or pellet-like in shape, ring shaped, saddle shaped or a combination thereof.

18. The filtration media of claim 14, wherein the oleo material is in the air stream as an aerosol.

19. The filtration media of claim 14, wherein the inorganic, porous particles comprise a ceramic material.

20. The filtration media of claim 14, wherein the inorganic, porous particles comprise a metal.

21. An apparatus for substantially separating an oleo material from an air stream, comprising filtration media of claim 14, a duct positioned in relationship with the bed of particles, wherein the air stream passes through at least a portion of the duct before passing through the bed.

22. A filtration media comprising:

a plurality of porous particles arranged in a bed, the particles being configured to remove grease from an air stream which passes through the bed, the particles comprising at least one of metal, ceramic material, or combinations thereof;

wherein the filtration media is configured to be used in a ventilation system which channels the air stream from an area where the grease is being heated to another location.

23. The filtration media of claim 22 wherein the particles comprise a ceramic material.

24. The filtration media of claim 22 wherein the particles are configured to absorb the grease.

25. The filtration media of claim 22 wherein the particles comprise silica.

26. A filtration media comprising:

a plurality of porous particles arranged in a bed, the particles being configured to remove grease from an air stream which passes through the bed, the particles comprising at least one of a transition metal oxide, zircon, silica, alumina, alumina-silica, or combinations thereof;

wherein the filtration media is configured to be used in a ventilation system which channels the air stream from an area where the grease is being heated to another location.

27. The filtration media of claim 26 wherein the particles comprise silica.

28. The filtration media of claim 26 wherein the particles are configured to absorb the grease.

29. The filtration media of claim 26 wherein the particles are inorganic.

30. The filtration media of claim 26, wherein the particles comprise at least one of zirconia, titania, iron, or combinations thereof.

31. The filtration of claim 26, wherein the alumina-silica comprises at least one of kaolin, bentonite, montmorillonite, or combinations thereof.

32. The ventilation system of claim 1, wherein the bed is positioned in a duct.

33. The ventilation system of claim 7, wherein the inorganic porous particles are at least partially composed of zirconia, titania, iron, or combinations thereof.

* * * * *